United States Patent
Savvides et al.

(10) Patent No.: US 11,900,516 B2
(45) Date of Patent: Feb. 13, 2024

(54) SYSTEM AND METHOD FOR POSE TOLERANT FEATURE EXTRACTION USING GENERATED POSE-ALTERED IMAGES

(71) Applicants: CARNEGIE MELLON UNIVERSITY, Pittsburgh, PA (US); Marios Savvides, Wexford, PA (US); Kai Hu, Pittsburgh, PA (US); Yutong Zheng, Pittsburgh, PA (US); Ahmed Uzair, Pittsburgh, PA (US); Sreena Nallamothu, Pittsburgh, PA (US)

(72) Inventors: Marios Savvides, Wexford, PA (US); Kai Hu, Pittsburgh, PA (US); Yutong Zheng, Pittsburgh, PA (US); Ahmed Uzair, Pittsburgh, PA (US); Sreena Nallamothu, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 0 days.

(21) Appl. No.: 18/011,558

(22) PCT Filed: Mar. 28, 2022

(86) PCT No.: PCT/US2022/022112
§ 371 (c)(1),
(2) Date: Dec. 20, 2022

(87) PCT Pub. No.: WO2022/212238
PCT Pub. Date: Oct. 6, 2022

(65) Prior Publication Data
US 2024/0013457 A1    Jan. 11, 2024

Related U.S. Application Data

(60) Provisional application No. 63/170,230, filed on Apr. 2, 2021.

(51) Int. Cl.
*G06T 11/60* (2006.01)
*G06T 17/00* (2006.01)
(Continued)

(52) U.S. Cl.
CPC ............... *G06T 11/60* (2013.01); *G06T 3/60* (2013.01); *G06T 17/00* (2013.01); *G06V 10/44* (2022.01);
(Continued)

(58) Field of Classification Search
CPC . G06T 11/60; G06T 3/60; G06T 17/00; G06T 2207/20081; G06T 2207/20084;
(Continued)

(56) References Cited

U.S. PATENT DOCUMENTS 9,858,481 B2 *   1/2018   Booth ............... G06V 10/32
10,319,094 B1 *  6/2019   Chen .................. G06N 3/08
(Continued)

OTHER PUBLICATIONS

Brownlee, Jason., "How to Configure Image Data Augmentation in Keras" Machine Learning Mastery. Apr. 12, 2019 URL: https://machinelearningmastery.com/how-to-configure-image-data-augmentation-when training-deep-learning-neural-networks/.
(Continued)

*Primary Examiner* — Michael S Osinski
(74) *Attorney, Agent, or Firm* — KDW Firm PLLC (57) ABSTRACT

Disclosed herein is a system and method for augmenting data by generating a plurality of pose-altered images of an item from one or more 2D images of the item and using the augmented data to train a train a feature extractor. In other aspects of the invention, the trained feature extractor is used to enroll features extracted from images of new products in a library database of known products or to identify images
(Continued)

of unknown products by matching features of an image of the unknown product with features stored in the library database.

20 Claims, 9 Drawing Sheets

(51) Int. Cl.
    *G06T 3/60*     (2006.01)
    *G06V 20/68*     (2022.01)
    *G06V 10/56*     (2022.01)
    *G06V 10/74*     (2022.01)
    *G06V 10/44*     (2022.01)

(52) U.S. Cl.
    CPC ............ *G06V 10/56* (2022.01); *G06V 10/761* (2022.01); *G06V 20/68* (2022.01)

(58) Field of Classification Search
    CPC ............. G06T 2210/16; G06T 2200/24; G06T 2207/10024; G06T 2207/10028; G06T 7/73; G06T 15/04; G06T 19/20; G06V 10/44; G06V 10/56; G06V 10/761; G06V 20/68; G06V 10/462; G06V 10/757; G06V 10/82; G06V 10/32; G06N 3/045; G06N 3/08; G06N 20/00; G06F 18/214; G06F 18/22; G06F 18/24; G06F 16/56; G06F 16/5838; G06Q 30/0643; G06Q 10/087
    See application file for complete search history.

(56) References Cited

U.S. PATENT DOCUMENTS

| | | | | |
|---|---|---|---|---|
| 10,692,277 | B1* | 6/2020 | Sunkavalli | ................ G06T 7/40 |
| 10,785,452 | B2* | 9/2020 | Booth | .................... G06V 10/32 |
| 11,158,121 | B1* | 10/2021 | Tung | ...................... G06N 3/045 |
| 11,776,095 | B2* | 10/2023 | Sun | ........................ G06T 5/008 |
| | | | | 382/274 |
| 11,790,558 | B1* | 10/2023 | Balakrishnan | ........ G06F 18/214 |
| | | | | 382/154 |
| 2006/0067573 | A1 | 3/2006 | Parr | |
| 2012/0263385 | A1* | 10/2012 | van Zwol | ............ G06V 10/757 |
| | | | | 382/201 |
| 2014/0219569 | A1* | 8/2014 | Manson | .................. G06F 18/22 |
| | | | | 382/201 |
| 2016/0104042 | A1* | 4/2016 | Romanik | .................. G06T 7/33 |
| | | | | 382/103 |
| 2016/0148074 | A1 | 5/2016 | Jean | |
| 2017/0032220 | A1* | 2/2017 | Medasani | ............... G06F 18/23 |
| 2018/0047192 | A1* | 2/2018 | Kristal | ............... G06Q 30/0643 |
| 2018/0181802 | A1* | 6/2018 | Chen | .................... G06V 10/764 |
| 2018/0253869 | A1* | 9/2018 | Yumer | ..................... G06T 11/60 |
| 2019/0122404 | A1 | 4/2019 | Freeman | |
| 2019/0244407 | A1* | 8/2019 | Wiesel | .................... G06T 11/00 |
| 2020/0042831 | A1* | 2/2020 | Lee | ........................ G06V 20/10 |
| 2020/0066029 | A1* | 2/2020 | Chen | ........................ G06T 15/205 |
| 2020/0089954 | A1* | 3/2020 | Zia | .......................... G06V 20/64 |
| 2020/0184668 | A1* | 6/2020 | Rad | .......................... G06F 30/00 |
| 2020/0273237 | A1* | 8/2020 | Sunkavalli | .............. G06N 20/00 |
| 2020/0364920 | A1* | 11/2020 | Finch | ................... G06V 10/764 |
| 2021/0034984 | A1 | 2/2021 | Savvides | |
| 2021/0090209 | A1* | 3/2021 | Appleboim | ............. G06T 11/60 |
| 2021/0264234 | A1* | 8/2021 | Paris | ...................... G06N 3/045 |
| 2021/0374993 | A1* | 12/2021 | Guay | ...................... G06T 15/02 |
| 2022/0051040 | A1* | 2/2022 | Pegurri | ..................... G06N 3/08 |
| 2022/0051177 | A1* | 2/2022 | Savvides | ............... G06V 10/82 |
| 2022/0058425 | A1* | 2/2022 | Savvides | ............... G06F 18/214 |
| 2022/0058811 | A1* | 2/2022 | Pokhrel | ..................... G06N 3/08 |
| 2022/0114392 | A1* | 4/2022 | Chen | ...................... G06T 11/00 |
| 2022/0237336 | A1* | 7/2022 | Zhao | ........................ G06N 3/08 |
| 2023/0267724 | A1* | 8/2023 | Graf | ......................... G06N 3/02 |
| | | | | 382/156 |

OTHER PUBLICATIONS

International Search Report and Written Opinion for the International Application No. PCT/US2022/022112, dated Jul. 25, 2022, 18 pages.

* cited by examiner

SYSTEM AND METHOD FOR POSE TOLERANT FEATURE EXTRACTION USING GENERATED POSE-ALTERED IMAGES

RELATED APPLICATIONS

This application is a national phase filing under 35 U.S.C. § 371 claiming the benefit of and priority to International Patent Application No. PCMS2022/22112, filed Mar. 28, 2022, entitled "System and Method for Pose Tolerant Feature Extraction Using Generated Pose-Altered Images", which claims the benefit of U.S. Provisional Patent Application No. 63/170,230, filed Apr. 2, 2021. The contents of these applications are incorporated herein in their entireties.

BACKGROUND

In a retail setting, it is desirable to be able to use computer vision methods to detect and identify products on a retail shelf to aid in management of the retail establishment. For example, computer vision may be used to detect and identify products for various tasks, such as tracking product inventory, determining out-of-stock products and determining misplaced products. Product detection is one of the fastest-moving areas and plays a fundamental role in many retail applications such as product recognition, planogram compliance, out-of-stock management, and check-out free shopping.

To this end, numerous computer vision methods have been developed and many real-world applications based on those computer vision methods perform at a satisfactory level. Currently, various visual sensors (e.g., fixed cameras, robots, drones, and mobile phones) have been deployed in retail stores, enabling the application of advanced technologies to ease shopping and store management tasks.

Feature extractors typically extract features that are used in downstream tasks, such as classification. However, products can be of arbitrary poses in a real-world retail scene, especially when the image is taken by a camera not facing straight towards the shelf. For example, images could show products at arbitrary angles, rotated, crumpled (e.g., in the case of products packaged in bags, such as potato chips), color jittered, over-exposed, under-exposed, etc. Because of these difficulties, features extracted from images collected in a retail setting may not be able to be matched to features extracted from a pristine image of the product, such as an image of the product provided by the manufacturer. Therefore, the features extracted from these images may not be accurate for the downstream tasks.

SUMMARY

For building a system that is robust for product views, a conventional strategy is to train the artificial intelligence models based on the downstream task with overly sufficient data spanning across the different views of the objects. Collecting and accumulating qualified and representative datasets is not easy in the real world due to various time, labor and financial constraints. Data becomes the real bottleneck in the learning capacity of many of the machine learning and artificial intelligence models.

Described herein is a system and method for data augmentation strategies to generate machine learning training data that is crucial in training efficient models when the supply of training data is limited.

The disclosed system and method uses a neural network to learn the feature embeddings of objects in different object pose views (2D rotation, 3D rotation, light, resolution, etc.) to learn pose-invariant feature embeddings, neural representations that are invariant to both the 2D and 3D orientation of an object. The method trains the neural network using data augmented by a plurality of 2D views of the product.

In one embodiment, the plurality of 2D views are generated by first generating a 3D model of the product from a 2D image of the product, and then generating novel, synthetic 2D images of how the product looks at varying poses. Preferably, the 2D image from which the synthetic, pose-altered images are generated is a pristine image of the product supplied by the manufacturer, but any image may be used. In other embodiments, different methods of generating the synthetic, pose-altered 2D views are disclosed.

In a second aspect of the invention, features extracted from the varying views are enrolled in a database and used for product classification and, in a third embodiment, images of an unknown testing product are matched against a library database to attempt identification of the unknown product.

BRIEF DESCRIPTION OF THE DRAWINGS

By way of example, a specific exemplary embodiment of the disclosed system and method will now be described, with reference to the accompanying drawings, in which.

DETAILED DESCRIPTION

In the retail industry, new products are manufactured and brought to market on a regular basis. Additionally, existing products are always subject to a change in their packaging due to new designs or seasonal packaging throughout the year. To maintain a current library of products, it is important to be able to enroll and re-enroll product images in a timely manner.

To create an over-complete library of products with different variations in pose, the disclosed system and method first creates multiple 2D pose-altered images of the product. In a preferred embodiment, the multiple 2D pose-altered images are created by first creating a 3D model of the product from a high resolution 2D product image, which is often supplied by the manufacturer of the product. The 3D models can then be rotated along different axes, thereby providing access to different views of the same product from different view-points. Other method of generating the 2D pos-altered images of the product are also disclosed herein The method then extracts features from the generated pose-altered product images and adds these features to a library. This reduces the domain gap between the images in the library and the product images coming from store cameras, thus making the matching process invariant to the pose of the product to be identified. This results in a robust matching algorithm to recognize the product.

This approach creates a library of features representing products from different viewpoints. Each of the pose-altered images (as well as the original image of the product) are then passed through a feature extractor to obtain features of the images, which are then stored in a library database.

To train the feature extraction method for classification with a limited dataset access of products at different angles, the invention employs a training method that uses generation of 3D models of products from 2D images. These 3D models can be used to synthesize novel 2D images of the product from various viewpoints that can be used as a training dataset for building a classifier or a feature representation/extraction method (e.g., a feature extractor). The described method is key to building any type of pose-tolerant feature extraction method.

In one embodiment, to build a robust feature extractor for product identification regardless of data type, a self-supervised method is applied to augment the database for training. The method is a mixture of data augmentation strategies and multiple loss functions. A major performance improvement is achieved in comparison to traditional classification methods. The method is independent of model architecture and other existing components for classification tasks.

Figure 1:
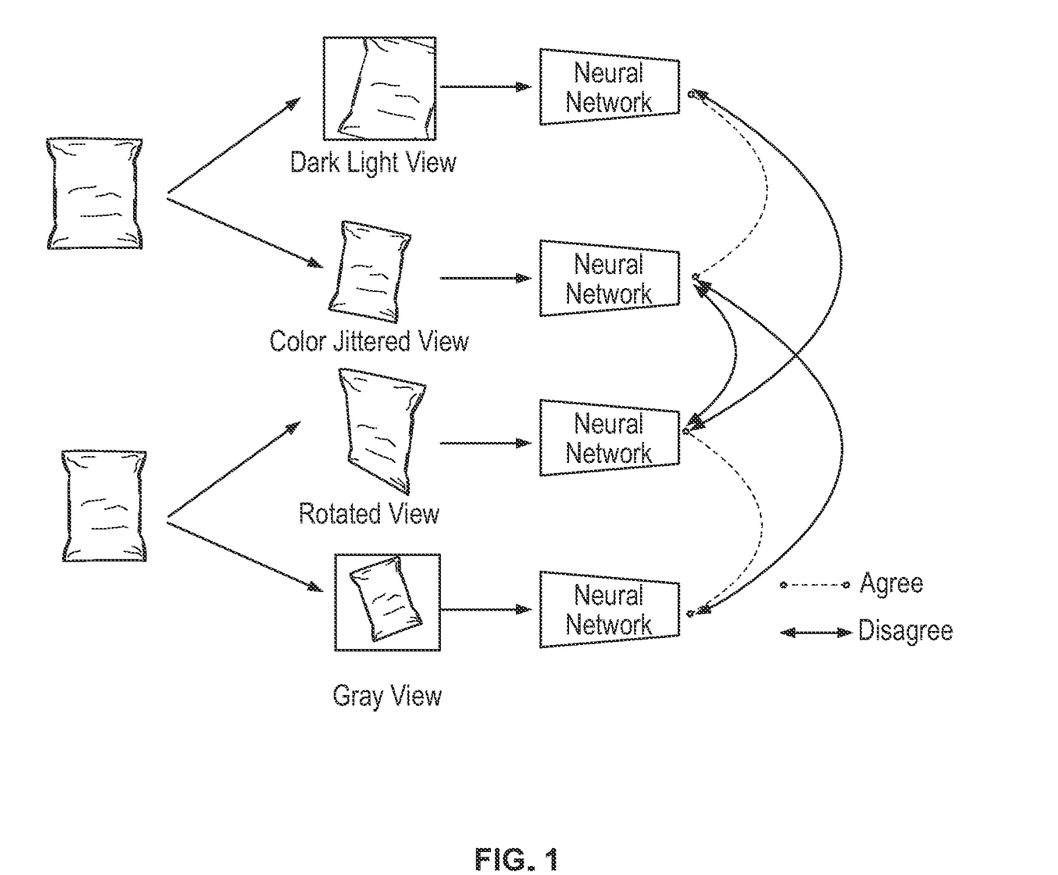
FIG. 1 is an illustration showing training of a feature extractor using augmented views as disclosed herein.

To achieve this, the method specifies a metric learning that maximizes the agreement/similarity between augmented images of the same product and minimizes that between different products in the feature space. After a good feature extractor is learned, many downstream tasks can be greatly improved using features extracted from the products, as shown in FIG. 1. In addition, ring loss, as described in U.S. Published Patent Application No. 2021/0034984, may be applied along with self-supervised learning to improve the model's capability to do classification for associated tasks.

For product identification, there is typically an onboarding product approach. One such product identification generates a 3D model. The method and process of feature extraction using 3D models can be applied for enrolling an image to onboard a new product using a 3D model generated from 2D images or other descriptions of the product with or without pose variations.

Several aspects of the invention specify different ways to generate the 3D model or to otherwise generate augmented 2D images of the product having alternate poses.

Figure 2:
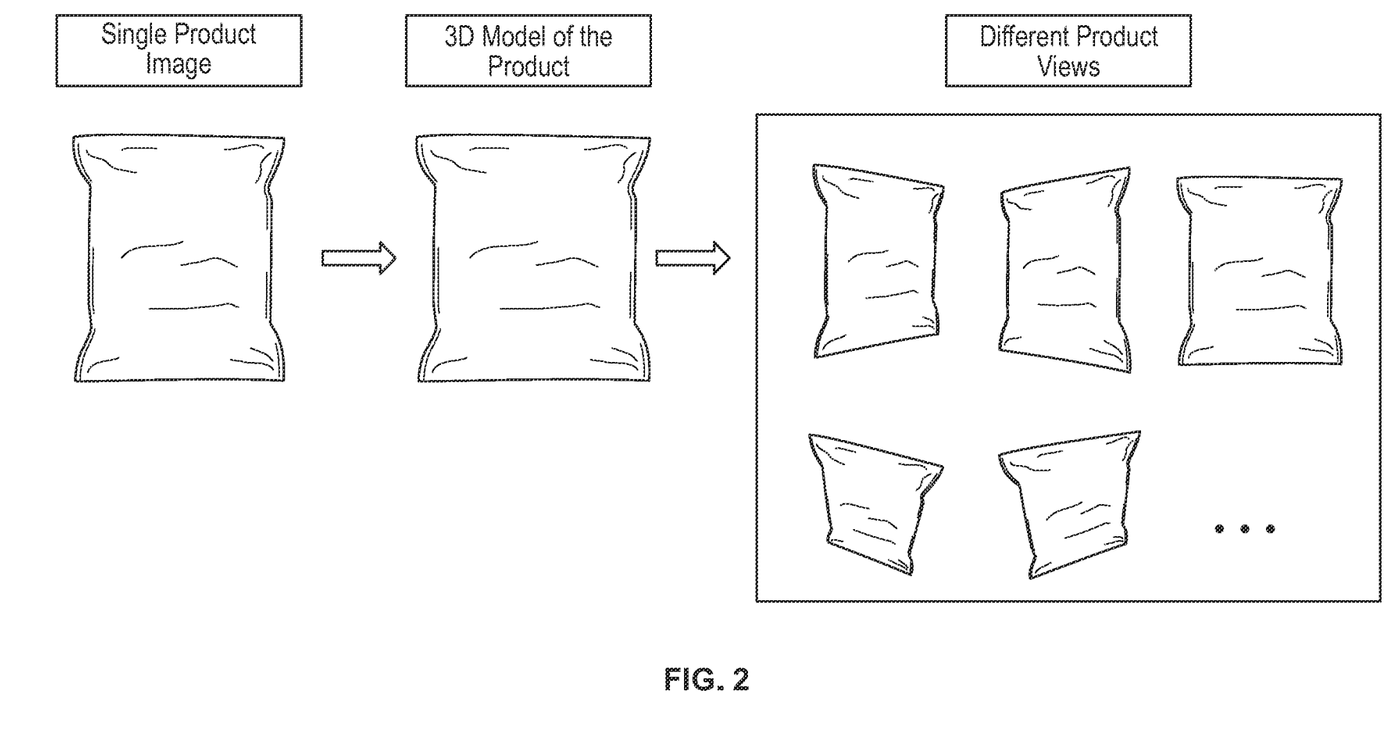
FIG. 2 is an illustration of a first aspect of the invention for generating the augmented views from a single image of the product.

In a first aspect of the invention, shown in FIG. 2, product views are generated using 3D model generation. In this approach, novel product views are generating a 3D model of the product, perturbing the 3D model in a plurality of different ways and capturing 2D views from the perturbations of the 3D model. The 3D model can be perturbed by rotation of the product along any or all of the 3 axes for any combination of degrees of rotation, thus generating product views from different viewpoints.

Figure 3:
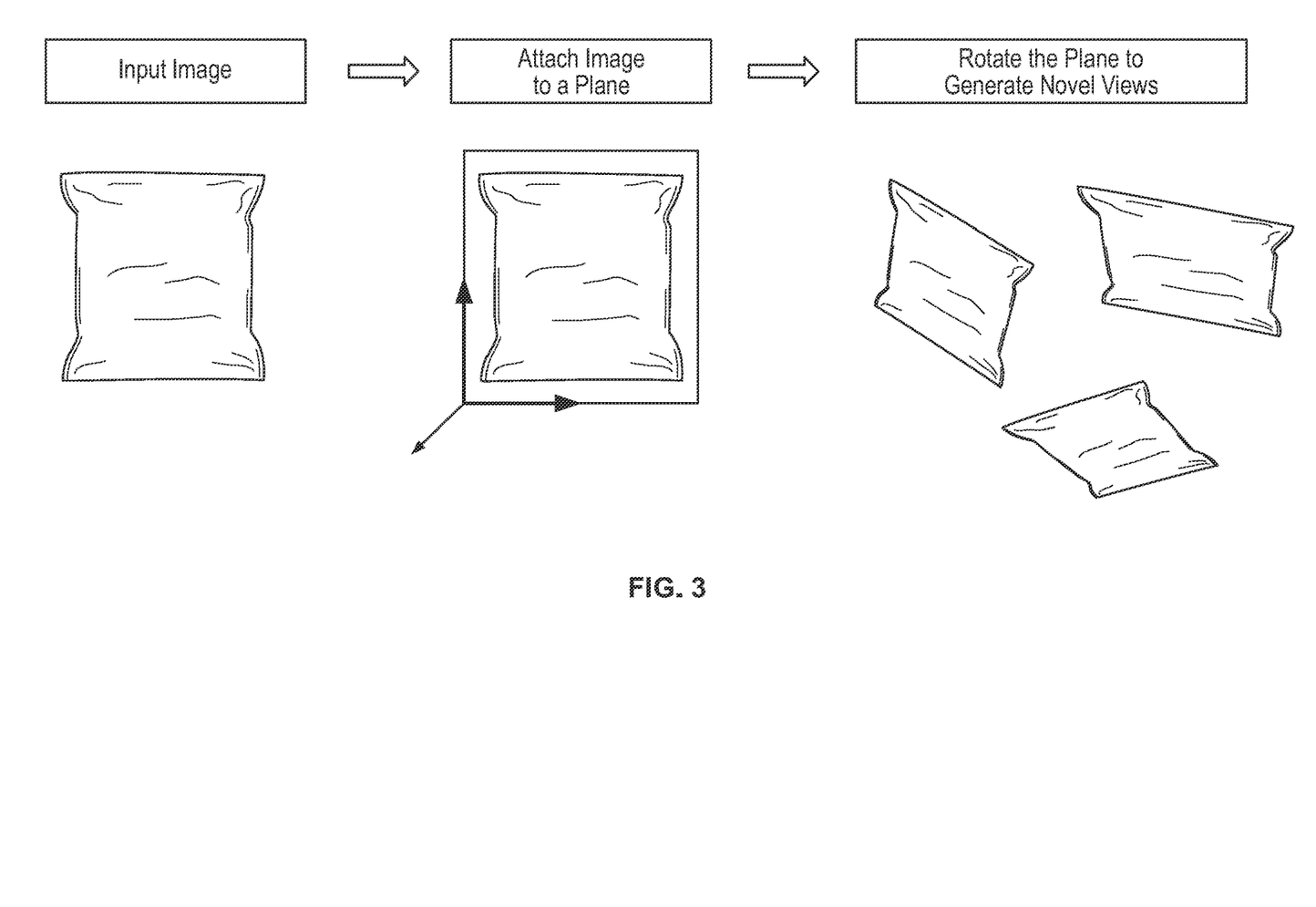
FIG. 3 is an illustration of a second aspect of the invention for generating the augmented views from a single image of the product.

In a second aspect of the invention, shown in FIG. 3, product views are generated using a 3D planar warp. In this method, explicit creation of the 3D model is avoided. The 2D image is fixed onto a plane with a known depth. Because the depth of the plane is known, the plane can be rotated along the 3 different axes to generate product images from different viewpoints.

Figure 4:
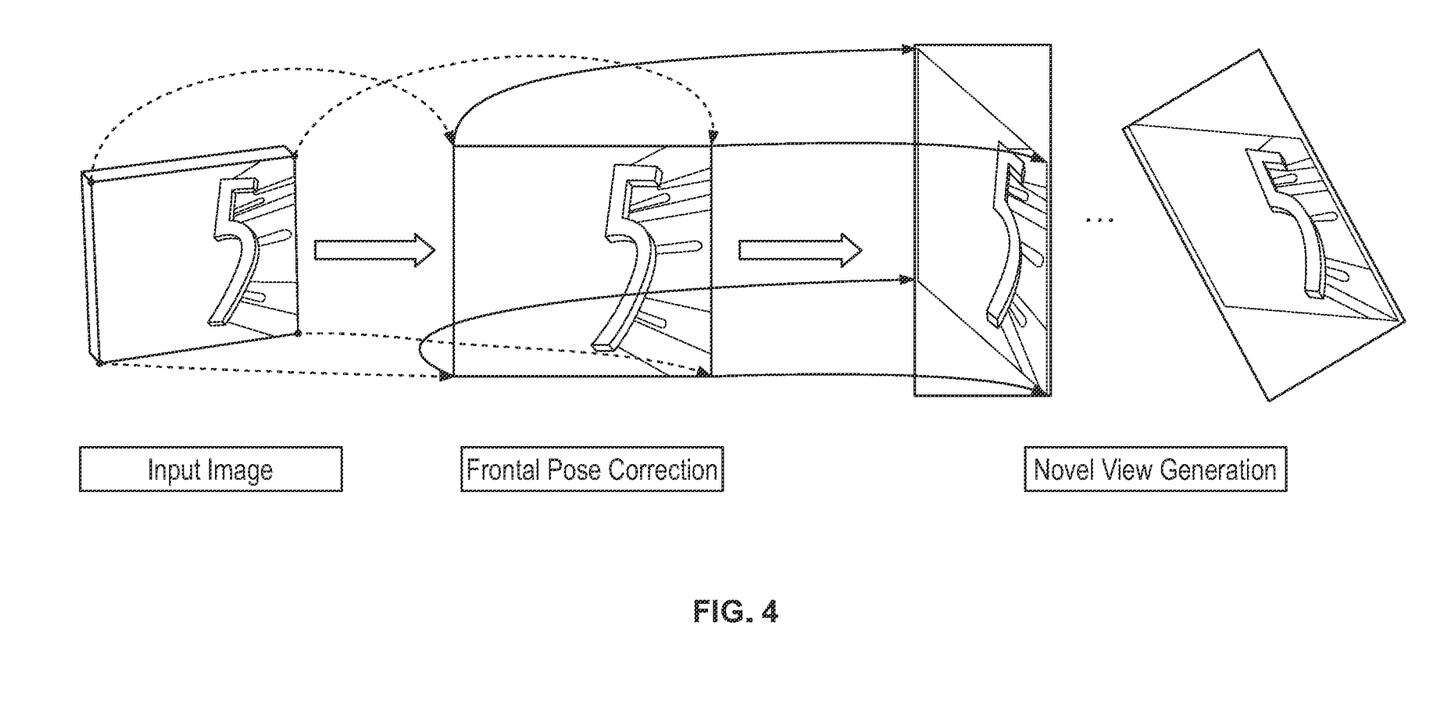
FIG. 4 is an illustration of a third aspect of the invention for generating the augmented views from a single image of the product.

In a third aspect of the invention, shown in FIG. 4, product views are generated by 2D projective transforms. Planar homography is a powerful tool that can be leveraged to fit images to arbitrary poses as long as all of the corresponding points maintain the same depth. In this approach, novel views are generated by fitting the corner endpoints of the image to different configurations, thus simulating different views.

Figure 5:
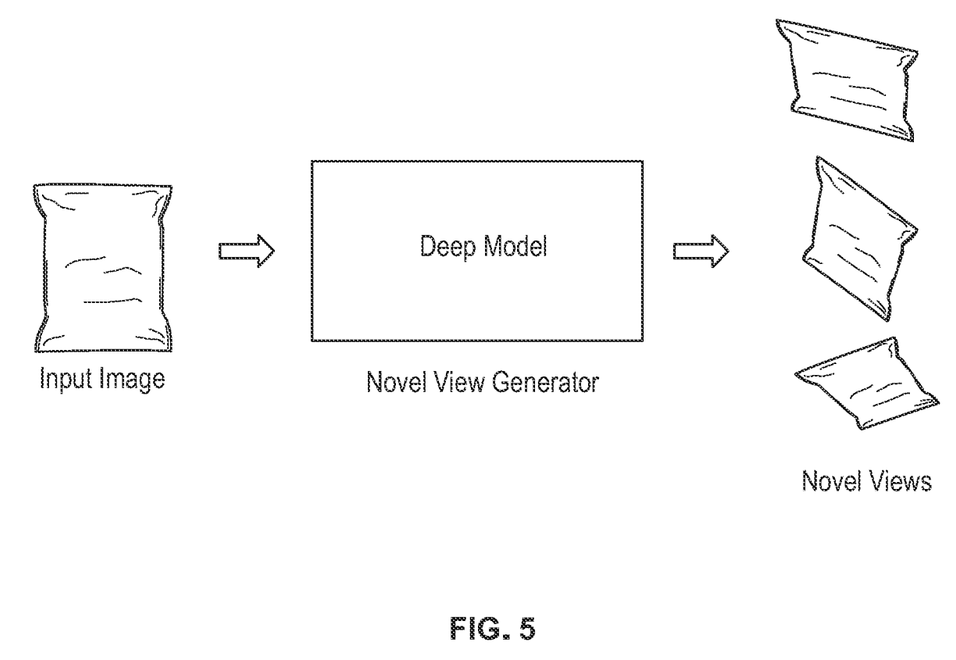
FIG. 5 is an illustration of a fourth aspect of the invention for generating the augmented views from a single image of the product.

In a fourth aspect of the invention, shown in FIG. 5, a machine learning-based data generation method is used. Generative modeling is a well-known technique in machine learning where a distribution of the input samples is learned from the labels, where sampling the distribution leads to the generation of novel data samples. Various methods include, but are not limited to, the use of autoencoders and adversarial learning based methods, spatial transformer networks where novel product views may be generated from various input reference images.

For any of the aspects of the invention for generation of the pose-altered views of the product, in the case wherein products have more than one side visible in the 2D image, an additional optional step may be added to first pose-correct the image such that only the front facing side of the product is visible. The frontal pose correction to get the front face of the product may or may not be done based on the application for which the data is being augmented.

As would be realized by one of skill in the art, any method of generating multi-pose images of an item from a single 2D image may be used to augment the training dataset, as well as to provide additional views for feature extraction, wherein the extracted features are enrolled in the library for later matching with features extracted from live images of the products.

Figure 6:
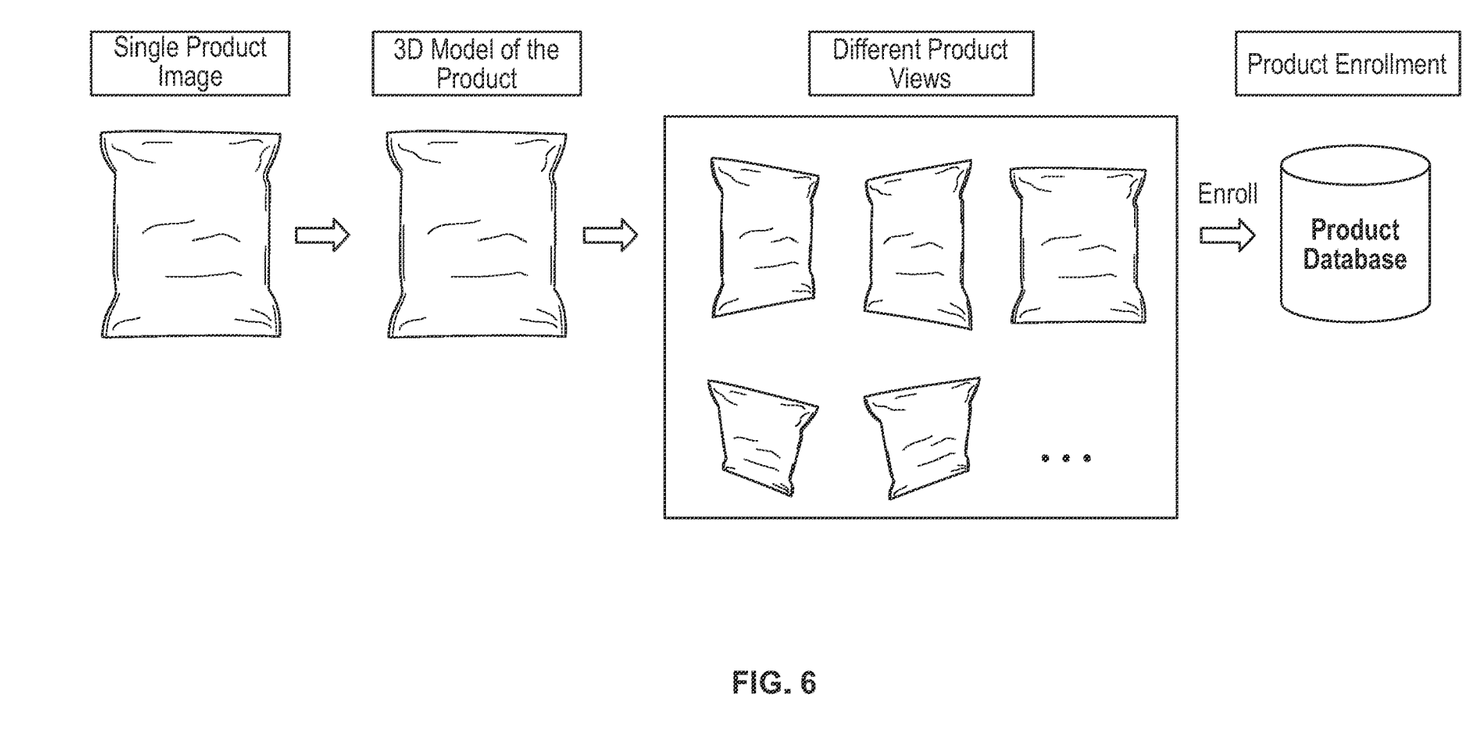
FIG. 6 is an illustration of the process of enrolling extracted feature in a product database library.

The synthesized, pose-altered, novel views of a product generated by data augmentation approaches such as any of the methods in the four aspects described herein, or by any other method, can be used for enrollment of the product in a product identification system, as shown in FIG. 6. Augmented image data can be used to extract features to be enrolled in a library database for further matching or training. The augmented image data can be sent to a database for 1:1 or 1:N verifications using an image classifier.

This method and process applies to any machine learning and artificial intelligence system using only a single reference image of a product by generating various product views for matching uses. That reference image can be a retail product image or a single captured image of a product from any capture source.

In some aspects of the invention, the features are extracted from all or partially synthesized or augmented views and are matched with features extracted from an image of an unknown testing product, which may have been captured, for example, by a robotic inventory system of a retail establishment. This matching provides a very efficient way to enroll products. It also provides the matching at any angle based on the reference image when only a single pose image of the product is available.

In another aspect of the invention, if more than one reference image is available, then more views can be generated and more image variations of the product become available for training, learning, and detection. For example, augmented 3D models may generate front and back views of a product for use by the learning and detection models. This provides the system a full view of the product. Thus, using the augmented 3D models of the products in an artificial intelligence model for object detection, or the techniques and approaches outlined above, the system generates multiple images from various viewpoints to simulate the camera settings and reduce the domain gap between the training and testing scenarios.

Figure 7:
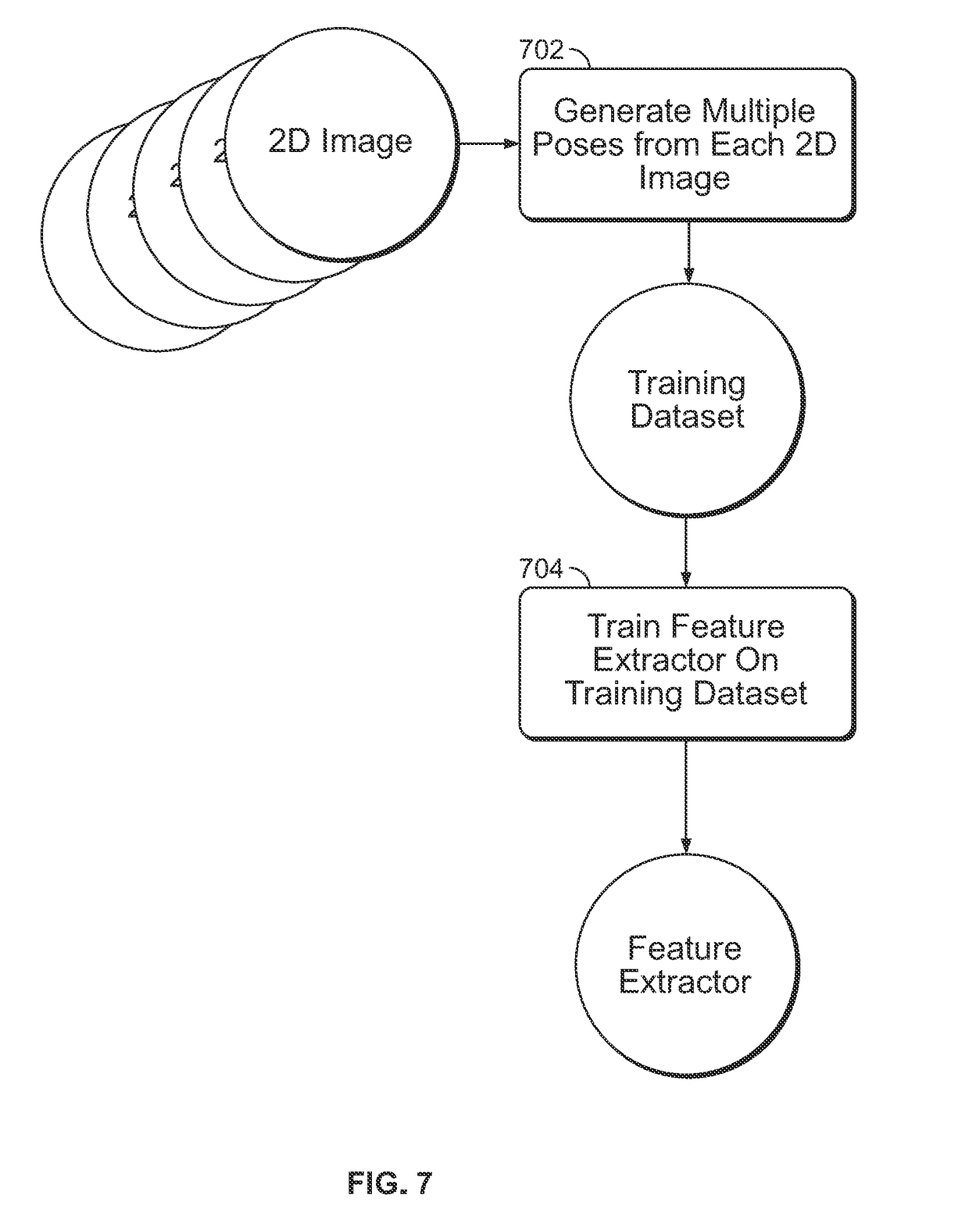
FIG. 7 is a flowchart depicting the training process of the feature extractor.

FIG. 7 is a flowchart showing the process of training the feature extractor. 2D images of various items are gathered and, at step 702, synthetic images showing multiple poses of the items in the 2D images are generated from each of the 2D images. In preferred embodiments of the invention one of the methods described herein for generating the synthetic, pose-altered images may be used. In alternate embodiments, any other method of generating the synthetic, pose-altered images may be used. The original 2D images, along with the synthetic pose-altered images comprise the training dataset for the feature extractor. At 704, the feature extractor is trained on the training dataset, resulting in a feature extractor trained to extract features from images showing multiple poses of a single item, which may be used for product enrollment or for product identification, as described with respect to FIG. 8 and FIG. 9.

Figure 8:
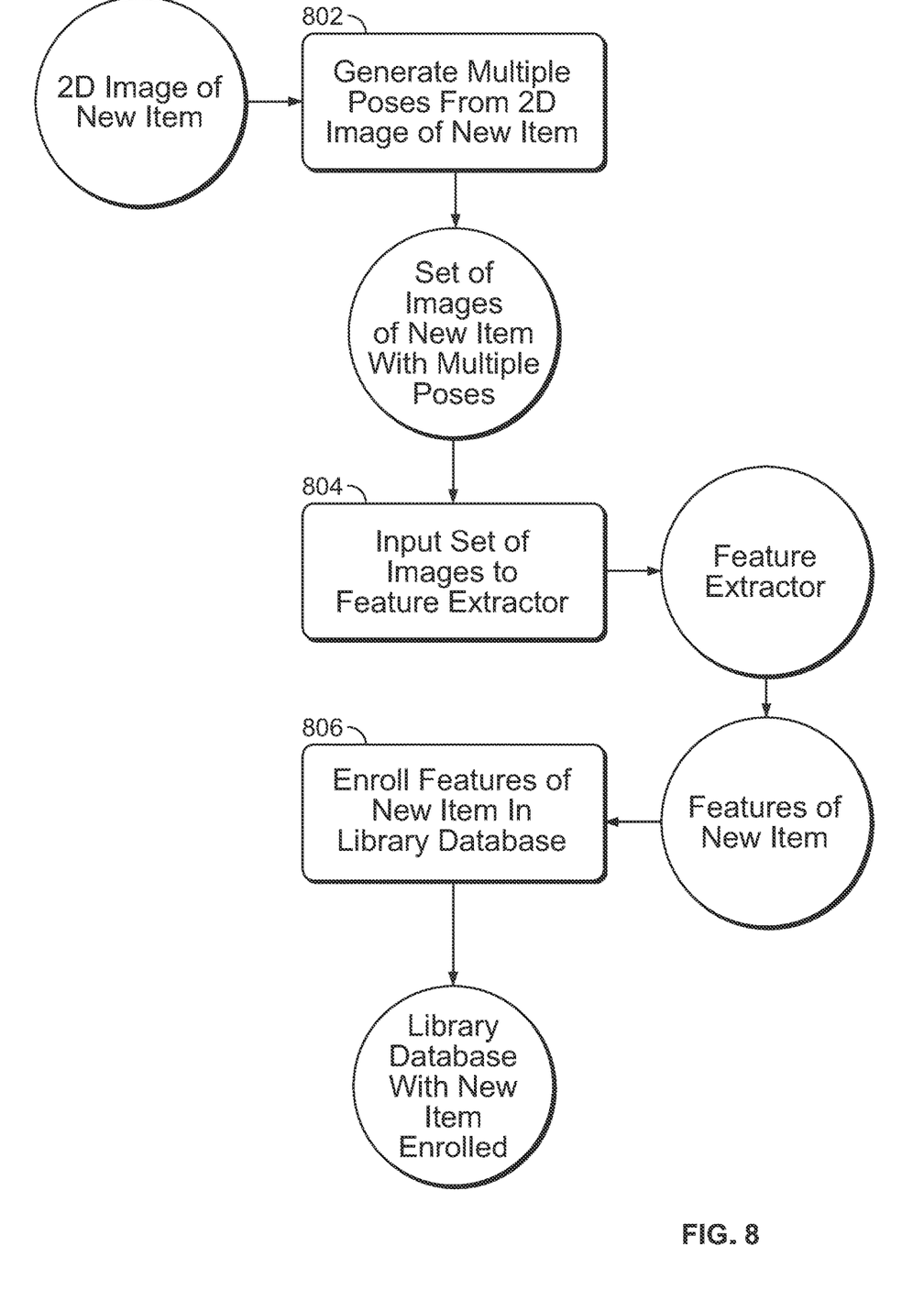
FIG. 8 is a flowchart depicting the process of enrolling a new item in the library database.

FIG. 8 is a flowchart showing the process of enrolling a new product in the library database. A 2D image of the new item is used to generate multiple synthetic, pose-altered images of the new item at step 802, resulting in a set of images of the new item with multiple poses (including the original 2D image of the item). The set of images of the new item is then input to the feature extractor at step 804. The feature extractor extracts features of the images and, at step 806, the features of the images are enrolled in the library database for use in product identification, as described with respect to FIG. 9.

Figure 9:
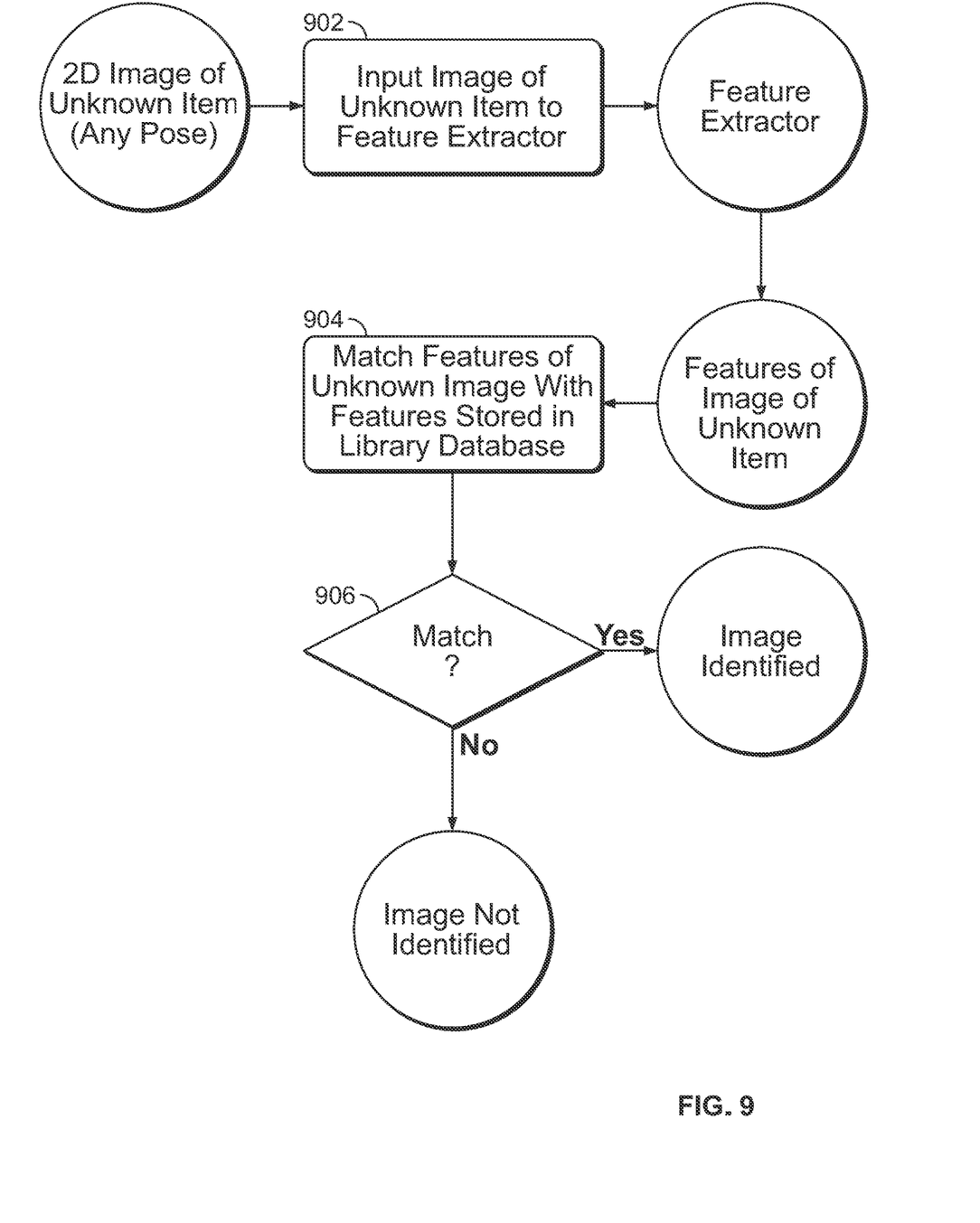
FIG. 9 is a flowchart depicting the process of matching an unknown item with items enrolled in the library database.

FIG. 9 is a process of matching an image of an unknown item with a known image. The 2D image of the unknown item may have any pose. At 902, the image of the unknown item is input to the feature extractor. The feature extractor outputs features of the image of the unknown item and, at step 904, an attempt is made to match the features of the image of the unknown item with features of images of items in the library database, including the pose-altered images of the items in the library database. At 906, if there is a match, the image is positively identified. At 906, if no match is found, the images not identified. The unidentified image may then optionally be enrolled in the library database by the process shown in FIG. 8. The matching may be performed by a trained classifier.

As would be realized by one of skill in the art, the disclosed method described herein can be implemented by a system comprising a processor and memory, storing software that, when executed by the processor, performs the functions comprising the method.

As would further be realized by one of skill in the art, many variations on implementations discussed herein which fall within the scope of the invention are possible. Moreover, it is to be understood that the features of the various embodiments described herein were not mutually exclusive and can exist in various combinations and permutations, even if such combinations or permutations were not made express herein, without departing from the spirit and scope of the invention. Accordingly, the method and apparatus disclosed herein are not to be taken as limitations on the invention but as an illustration thereof. The scope of the invention is defined by the claims which follow.

The invention claimed is:

1. A method comprising:
    generating a plurality of synthetic pose-altered images of a plurality of items based on one or more 2D images of each of the plurality of items; and
    training a feature extractor to extract features of the synthetic pose-altered images;
    wherein the synthetic pose-altered images include views of the items which are modified from the one or more 2D images of the items, the modifying including presenting the items at arbitrary angles, rotating the items, translating the items, crumpling the items, modifying the colors of the items, over-exposing the items and under-exposing the items.

2. The method of claim 1 further comprising:
    generating a plurality of synthetic pose-altered images of a new item based on one or more 2D images of the new item;
    inputting the synthetic pose-altered images of the new item to the feature extractor to obtain features of the synthetic pose-altered images; and
    enrolling the extracted features in a library database.

3. The method of claim 2 wherein the one or more 2D images of the new item are also input to the feature extractor.

4. The method of claim 1 further comprising:
    identifying an unknown item in a testing image by:
        exposing the testing image of the unknown item to the feature extractor to obtain features of the testing image; and
        matching the features extracted from the testing image with features enrolled in the library database to determine a match to identify the unknown item.

5. The method of claim 4 wherein the matching is performed by a trained classifier.

6. The method of claim 1 wherein the step of generating a plurality of synthetic pose-altered images comprises:
    generating a 3D model of the item from the one or more 2D images of the item;
    generating images showing different viewpoints of the item by rotating the 3D model along one or more axes.

7. The method of claim 1 wherein the step of generating a plurality of synthetic pose-altered images comprises:
    fixing the one or more 2D images of the item to a plane with a known depth; and
    generating images showing different viewpoints of the item by rotating the 2D images along one or more of the axes of the plane.

8. The method of claim 1 wherein the step of generating a plurality of synthetic pose-altered images comprises:
    using planar homography by fitting corner endpoints of the one or more 2D images to different configurations to simulate different views of the item.

9. The method of claim 1 wherein the step of generating a plurality of synthetic pose-altered images comprises:
    training a machine learning model to generate the synthetic pose-altered images; and
    inputting the one or more 2D images of the item to the machine learning model.

10. The method of claim 1 further comprising:
    pose correcting the one or more 2D images of the item to eliminate portions of the one or more 2D containing views of sides of the item other than the frontal side.

11. A system comprising:
    a processor; and
    a memory storing software that, when executed by the processor, causes the system to:

generate a plurality of synthetic pose-altered images of a plurality of items based on one or more 2D images of each of the plurality of items; and train a feature extractor to extract features of the pose-altered images;

wherein the synthetic pose-altered images include views of the items which are modified from the one or more 2D images of the items, the modifying including presenting the item at arbitrary angles, rotating the item, translating the item, crumpling the item, modifying the colors of the item, over-exposing the item and under-exposing the item.

12. The system of claim 11 the software further causing the system to:

generate a plurality of synthetic pose-altered images of a new item based on one or more 2D images of the new item;

input the one or more synthetic pose-altered images of the new item to the feature extractor to obtain features of the synthetic pose-altered images; and enroll the extracted features in a library database.

13. The system of claim 12, the software further causing the system to:

input the one or more 2D images of the new item into the feature extractor.

14. The system of claim 1, the software identifying an unknown item in a testing image by causing the system to:

expose the testing image of the unknown item to the feature extractor to obtain features of the testing image; and match the features extracted from the testing image with features enrolled in the library database to determine a match to identify the unknown item.

15. The system of claim 14 wherein the matching is performed by a trained classifier.

16. The system of claim 11 wherein the software causes the generation of the plurality of synthetic pose-altered images by causing the system to:

generate a 3D model of the item from the one or more 2D images of the item; and generate images showing different viewpoints of the item by rotating the 3D model along one or more of the axes.

17. The system of claim 11 wherein the software causes the generation of the plurality of synthetic pose-altered images by causing the system to:

fix the one or more 2D images of the item to a plane with a known depth; and generate images showing different viewpoints of the item by rotating the 2D images along one or more of the axes of the plane.

18. The system of claim 11 wherein the software causes the generation of the plurality of synthetic pose-altered images by causing the system to:

use planar homography by fitting corner endpoints of the one or more 2D images to different configurations to simulate different views of the item.

19. The system of claim 11 wherein the software causes the generation of the plurality of synthetic pose-altered images by causing the system to:

train a machine learning model to generate the synthetic pose-altered images; and input the one or more 2D images of the item to the machine learning model.

20. The system of claim 11 wherein the software further causes the system to:

pose correct the one or more 2D images of the item to eliminate portions of the one or more 2D images containing views of sides of the item other than the frontal side.

* * * * *